(12) United States Patent
Izutani et al.

(10) Patent No.: US 9,528,020 B2
(45) Date of Patent: Dec. 27, 2016

(54) COATING COMPOSITION, METHOD FOR PRODUCING SAME, AND COATED ARTICLE

(71) Applicant: MITSUBISHI ELECTRIC CORPORATION, Chiyoda-ku (JP)

(72) Inventors: Tasuku Izutani, Chiyoda-ku (JP); Yasuhiro Yoshida, Chiyoda-ku (JP); Yoshinori Yamamoto, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 26 days.

(21) Appl. No.: 14/652,931

(22) PCT Filed: Dec. 2, 2013

(86) PCT No.: PCT/JP2013/082358
§ 371 (c)(1),
(2) Date: Jun. 17, 2015

(87) PCT Pub. No.: WO2014/106922
PCT Pub. Date: Jul. 10, 2014

(65) Prior Publication Data
US 2015/0337156 A1 Nov. 26, 2015

(30) Foreign Application Priority Data
Jan. 7, 2013 (JP) .................. 2013-000654

(51) Int. Cl.
| | | |
|---|---|---|
| *C09D 127/12* | (2006.01) | |
| *C08K 3/36* | (2006.01) | |
| *C08K 3/34* | (2006.01) | |
| *C09D 201/00* | (2006.01) | |
| *C09D 5/16* | (2006.01) | |
| *C09D 7/12* | (2006.01) | |

(52) U.S. Cl.
CPC ............... *C09D 127/12* (2013.01); *C08K 3/34* (2013.01); *C08K 3/36* (2013.01); *C09D 5/1681* (2013.01); *C09D 7/1291* (2013.01); *C09D 201/00* (2013.01); *C08K 2201/016* (2013.01)

(58) Field of Classification Search
CPC ....... C09D 127/12; C09D 201/00; C08K 3/34; C08K 3/36
USPC ........................ 524/456; 427/385.5
See application file for complete search history.

(56) References Cited

U.S. PATENT DOCUMENTS 7,211,313 B2    5/2007  Nun et al.

FOREIGN PATENT DOCUMENTS

| | | |
|---|---|---|
| CN | 101823722 A | 9/2010 |
| CN | 102239224 A | 11/2011 |
| DE | 3922178 A1 | 1/1991 |
| EP | 0 395 100 A2 | 10/1990 |
| EP | 0 395 100 A3 | 10/1990 |
| EP | 0 523 357 A2 | 1/1993 |
| EP | 0 905 204 A2 | 3/1999 |
| EP | 0 905 204 A3 | 3/1999 |
| EP | 1 316 603 A1 | 6/2003 |
| JP | 2002-121489 A | 4/2002 |
| JP | 2002121489 A * | 4/2002 |
| JP | 2006-143866 A | 6/2006 |
| JP | 2009-138033 A | 6/2009 |
| JP | 2009138033 A * | 6/2009 |
| JP | 2010-89373 A | 4/2010 |
| JP | 2011-140625 A | 7/2011 |
| JP | 4790003 | 10/2011 |
| WO | 2008/120695 A1 | 10/2008 |
| WO | 2008/143064 A1 | 11/2008 |

OTHER PUBLICATIONS

Kazutoshi Haraguchi, et al., "Mechanism of Forming Organic/Inorganic Network Structures during In-Situ Free-Radical Ploymerization in PNIPA-Clay Nanocomposite Hydrogels", Macromolecules, vol. 38, No. 8, Apr. 1, 2005, pp. 3482-3490.
Combined Chinese Office Action and Search Report issued Apr. 25, 2016 in Patent Application No. 201380069647.3 (with English Translation and English Translation of Category of Cited Documents).

* cited by examiner

*Primary Examiner* — Kelechi Egwim
(74) *Attorney, Agent, or Firm* — Oblon, McClelland, Maier & Neustadt, L.L.P.

(57) ABSTRACT

The coating composition of the present invention is characterized in that hydrophobic microparticles, and flat-shaped microparticles forming a card-house aggregate structure, are dispersed in a binder resin dissolved in a solvent. Preferably, the aspect ratio of table faces and end faces of the flat-shaped microparticles is 10 or higher. Preferably, the average particle size of the flat-shaped microparticles in an aggregated state ranges from 125 nm to 200 μm. The coating composition of the present invention can form a coating film having few cracks and can impart high water repellency and high oil repellency without the need for a complex operation.

10 Claims, 4 Drawing Sheets

COATING COMPOSITION, METHOD FOR PRODUCING SAME, AND COATED ARTICLE

TECHNICAL FIELD

The present invention relates to a coating composition that can impart high water repellency and oil repellency, to a method for producing the coating composition, and to a coated article.

BACKGROUND ART

Solid surfaces of glass, plastics, paper, textile products, metals and the like are often imparted with water repellency but are rarely imparted with oil repellency. However, in cases where a more pronounced anti-fouling effect against oil stains or the like needs to be imparted to such surfaces, it is desirable that the surface exhibits both a large contact angle and a small sliding angle not only with water, but also with low-surface tension substances typified by oils. Specifically, there is a demand for the formation of a coating film that combines both water repellency and oil repellency. Further, the coating film should preferably combine both high water repellency and high oil repellency, i.e. superhydrophobicity and superoleophobicity.

Patent Document 1 discloses a coating solution obtained by dispersing hydrophobic microparticles having an average primary particle size equal to or smaller than 100 nm in an organic solvent that contains 65 mass % or more of a hydrophobic solvent with respect to the total organic solvent. Patent Document 1 describes that a coating film formed by using the coating solution exhibits a contact angle of 140 degrees or more with water.

Patent Document 2 discloses a coating film having a root-mean-square surface roughness (RMS) of 100 nm or greater, obtained through application of a coating composition that comprises an alcohol, an alkoxysilane, a perfluoroalkyl silane, silica microparticles, a catalyst that promotes the hydrolysis reaction of the alkoxysilane, and water. Patent Document 2 indicates that a coating film formed using that coating solution exhibits a contact angle of 150 degrees or more with water and 130 degrees or more with oils.

Patent Document 1: Japanese Patent Application Laid-open No. 2010-155727
Patent Document 2: Japanese Patent Application Laid-open No. 2010-89373

SUMMARY OF INVENTION

Technical Problem

While Patent Document 1 allows the simple formation of a superhydrophobic coating film, there is a problem in that the oil repellency of the coating film is insufficient.

Since Patent Document 2 relies on a hydrolysis reaction, preparation of the coating solution requires time. Also, since a sufficient contact angle can not be obtained when the number of coating applications is small, there is a problem in that the number of process steps increases.

Further, there is a problem in that cracks occur during drying of the coating films of Patent Documents 1 and 2.

The present invention has been made to solve the above problems, and an object of the present invention is to provide a coating composition that can form a coating film having few cracks and can impart high water repellency and high oil repellency without the need for a complex operation.

Solution to the Problem

A coating composition according to the present invention is characterized in that hydrophobic microparticles, and flat-shaped microparticles forming a card-house aggregate structure, are dispersed in a binder resin dissolved in a solvent.

Advantageous Effects of the Invention

The present invention succeeds in providing a coating composition that can form a coating film having few cracks and can impart high water repellency and high oil repellency without the need for a complex operation.

DESCRIPTION OF EMBODIMENTS

Embodiment 1

Figure 1:
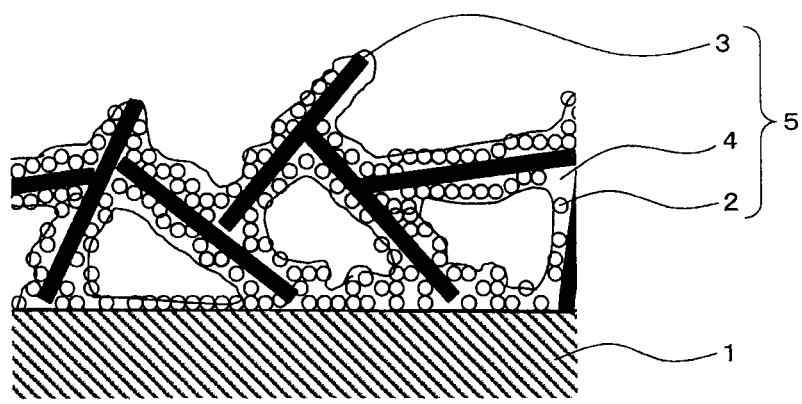
FIG. 1 is a schematic cross-sectional diagram of a coated article comprising a coating film according to Embodiment 1.
Figure 2:
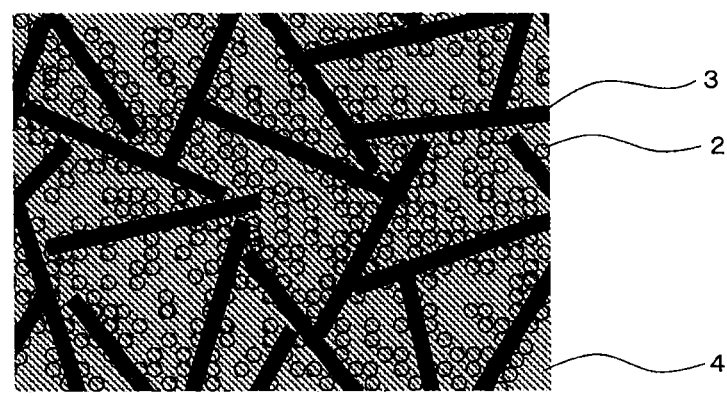
FIG. 2 is a schematic top-view diagram of a coated article comprising a coating film according to Embodiment 1.
Figure 3:
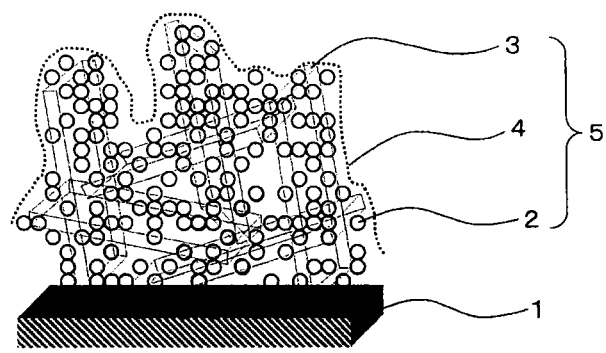
FIG. 3 is a schematic perspective-view diagram of a coated article comprising a coating film according to Embodiment 1.

FIG. 1 is a schematic cross-sectional diagram of a coated article comprising a coating film according to Embodiment 1 of the present invention. FIG. 2 is a schematic top-view diagram of a coated article comprising a coating film according to Embodiment 1 of the present invention. FIG. 3 is a schematic perspective-view diagram of a coated article comprising a coating film according to Embodiment 1 of the present invention. In these figures, a coating film 5 that comprises hydrophobic microparticles 2, flat-shaped microparticles 3 and a binder resin 4, is provided on the top face of a base material 1.

The mass ratio of hydrophobic microparticles 2 to the binder resin 4 in the coating film 5 (mass of the hydrophobic microparticles 2/mass of the binder resin 4) is ordinarily 0.5 or greater, and ranges preferably from 0.5 to 12, more preferably from 2 to 8. Small irregularities are formed on the surface of the coating film 5 by virtue of the presence of the hydrophobic microparticles 2. That fine uneven structure on the surface allows the water repellency of the coating film 5 to be increased. A mass ratio of the hydrophobic microparticles 2 to the binder resin 4 smaller than 0.5 is undesirable since, in that case, a fine uneven structure may in some instances can not be formed over the entire surface of the coating film 5, which precludes obtaining a coating film 5 with desired water repellency. On the other hand, a mass ratio of the hydrophobic microparticles 2 to the binder resin 4 in excess of 12 is undesirable since the amount of binder resin is then excessively small, and, as a result, a coating film 5 with desired strength may not be obtained, and the coating film 5 may peel off the base material 1.

Figure 4:
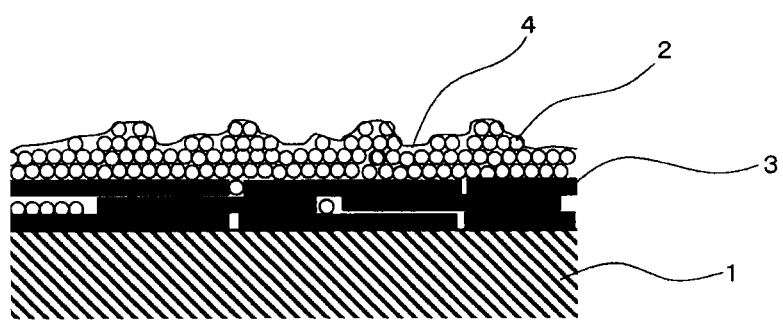
FIG. 4 is a schematic cross-sectional diagram of a coated article comprising a coating film formed from a coating composition comprising no flat-shaped microparticles.
Figure 5:
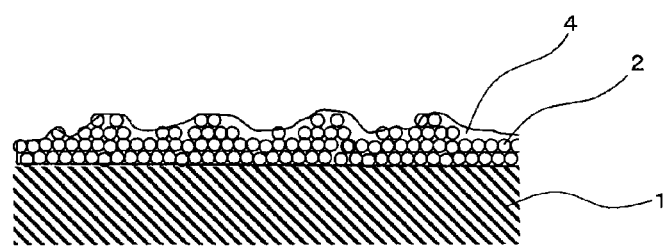
FIG. 5 is a schematic cross-sectional diagram of a coated article comprising a coating film formed from a coating composition comprising flat-shaped microparticles in a non-aggregated state.

A characterizing feature of the present invention is that the table faces and the end faces of the flat-shaped microparticles 3 in the coating film 5 are in contact with each other to form a card-house aggregate structure. Irregularities are formed on the surface of the coating film 5 by this card-house aggregate structure. These surface irregularities, which become compounded with the small irregularities formed by the hydrophobic microparticles 2, translate into a greater proportion of the liquid-gas contact surface area at the interface between the surface and a liquid according to the Cassie model; as a result, it becomes possible to bring out superlyophobicity towards liquids having a surface tension smaller than that of water. An uneven surface structure such as the one illustrated in FIG. 4 is obtained, and no oil repellency is achieved, in a case where the flat-shaped microparticles 3 do not form a card-house aggregate structure. This uneven surface structure is similar to an uneven surface structure that is formed in a case where no flat-shaped microparticles 3 are present (see FIG. 5).

The mass ratio of the hydrophobic microparticles 2 to the flat-shaped microparticles 3 in the coating film 5 (mass of the hydrophobic microparticles 2/mass of the flat-shaped microparticles 3) is 0.5 or greater, and ranges preferably from 0.5 to 5, and more preferably from 1 to 2. Small irregularities are formed on the surface of the flat-shaped microparticles 3 by virtue of the presence of the hydrophobic microparticles 2. This fine uneven structure on the surface allows the oil repellency of the hydrophobic microparticles 2 in the coating film 5 to be enhanced. A mass ratio of the hydrophobic microparticles 2 to the flat-shaped microparticles 3 smaller than 0.5 is undesirable, since in that case the hydrophobic microparticles 2 may in some instances not completely cover the surface of the flat-shaped microparticles 3, and the coating film 5 may not be imparted with the desired oil repellency. On the other hand, a mass ratio of the hydrophobic microparticles 2 to the flat-shaped microparticles 3 in excess of 5 is undesirable, since in this case, not only is the surface of the flat-shaped microparticles 3 covered by the hydrophobic microparticles 2, but also the uneven structure of the flat-shaped microparticles 3 becomes buried by the hydrophobic microparticles, all of which may preclude the desired oil repellency being imparted to the coating film 5.

The mass ratio of the flat-shaped microparticles 3 to the binder resin 4 in the coating film 5 (mass of the flat-shaped microparticles 3/mass of the binder resin 4) is 0.25 or greater, and ranges preferably from 0.25 to 12, and more preferably from 0.5 to 8. Irregularities are formed on the surface of the coating film 5 by virtue of the presence of the flat-shaped microparticles 3. The water repellency of the coating film 5 can be increased by that uneven structure on the surface. A mass ratio of the flat-shaped microparticles 3 to the binder resin 4 smaller than 0.25 is undesirable, since in that case the flat-shaped microparticles 3 may in some instances not be dispersed throughout the coating film 5, which may preclude a coating film 5 with desired water repellency being obtained. On the other hand, a mass ratio of the flat-shaped microparticles 3 to the binder resin 4 in excess of 12 is undesirable since the amount of binder resin 4 is then excessively small, and, as a result, a coating film 5 with desired strength may in some instances not be obtained, and the coating film 5 may peel off the base material 1.

The average particle size of the primary particles or secondary particles of the hydrophobic microparticles 2 is preferably 100 nm or smaller, and ranges more preferably from 5 nm to 100 nm, most preferably from 10 nm to 50 nm. An average particle size of the primary particles or secondary particles of the hydrophobic microparticles 2 in excess of 100 nm is undesirable since, in that case, the irregularities on the surface of the coating film 5 become excessively large, the proportion of the liquid-gas contact surface area on the surface of the coating film 5 does not decrease, and a coating film 5 with desired water repellency may not be obtained. When the irregularities on the surface of the coating film 5 are excessively large, the surface shape of the coating film 5 may change, due to external physical stimuli (for instance, collision with foreign matter, friction and the like), and water repellency may thus be impaired. On the other hand, an average particle size of the primary particles or secondary particles of the hydrophobic microparticles 2 smaller than 5 nm is undesirable since, in that case, the hydrophobic microparticles 2 aggregate readily, the fluidity of the coating composition decreases, and it may be difficult to coat the base material 1 with the coating composition. In the present invention, the average particle size of primary particles or secondary particles of the hydrophobic microparticles 2 is a value measured in accordance with a dynamic light scattering method.

Methods for hydrophobizing microparticle surfaces can be resorted to herein without particular limitations, so long as the method allows imparting hydrophobicity to microparticle surfaces. Preferably, for instance, fluorine or an alkyl group is incorporated in the surface. Methods for incorporating fluorine or an alkyl group into microparticle surfaces include, for instance, methods where organometallic compounds are utilized, for instance silylating agents, silane coupling agents or alkyl aluminum. The silylating agent herein is a compound that causes for instance alkyl groups, allyl groups and fluorine-containing fluoroalkyl groups to bond with hydrolyzable silyl groups that have affinity or reactivity towards inorganic materials. Examples of hydrolyzable groups that bond with silicon include, for instance, alkoxy groups, halogens, acetoxy groups and the like. Ordinarily used herein are preferably alkoxy groups such as methoxy groups and ethoxy group, or chlorine. Examples include, for instance, trimethyl silylating agents, alkyl silanes, aryl silanes, fluoroalkyl silanes and the like.

The hydrophobic microparticles 2 in the present invention are preferably silica having a hydrophobic surface. As used herein, the term "silica" does not refer strictly to silica in an $SiO_2$ state, and also encompasses silicon oxides. Silica having a hydrophobic surface includes, for instance, one obtained by subjecting the surface of silica to a hydrophobizing treatment. In other words, as the hydrophobic microparticles 2, silica having a hydrophobic surface, which is obtained by subjecting hydrophilic silica to a hydrophobizing treatment may be used.

The hydrophobic microparticles 2 used in the coating composition of the present invention can be commercially obtained under the product names "Aerosil 200" (by Nippon Aerosil Co. Ltd.), "Aerosil 300" (by Nippon Aerosil Co. Ltd.), "Aerosil 380" (by Nippon Aerosil Co. Ltd.), "Aerosil 90G" (by Nippon Aerosil Co. Ltd.), "Aerosil OX50" (by Nippon Aerosil Co. Ltd.), "Aerosil R972" (by Nippon Aerosil Co. Ltd.), "Aerosil 972V" (by Nippon Aerosil Co. Ltd.), "Aerosil R972CF" (by Nippon Aerosil Co. Ltd.), "Aerosil R974" (by Nippon Aerosil Co. Ltd.), "Aerosil R812" (by Nippon Aerosil Co. Ltd.), "Aerosil R805" (by Nippon Aerosil Co. Ltd.), "Aerosil RX200" (by Nippon Aerosil Co. Ltd.), "Aerosil RX300" (by Nippon Aerosil Co. Ltd.), "Aerosil RY200" (by Nippon Aerosil Co. Ltd.), "WACKER HDK H15" (by Wacker Asahikasei Silicone Co. Ltd.), "WACKER HDK H15" (by Wacker Asahikasei Silicone Co. Ltd.), "WACKER HDK H18" (by Wacker Asahikasei Silicone Co. Ltd.), "WACKER HDK H20" (by Wacker Asahikasei Silicone Co. Ltd.), "WACKER HDK H30" (by Wacker Asahikasei Silicone Co. Ltd.), "Reolosil HM20S" (by Tokuyama Corporation), "Reolosil HM30S" (by Tokuyama Corporation), "Reolosil HM40S" (by Tokuyama Corporation), "Reolosil ZD30S" (by Tokuyama Corporation), "Reolosil DM30S" (by Tokuyama Corporation) and the like.

The flat-shaped microparticles 3 in the present invention are for instance plate-like, flake-like, stripe-like or disc-like microparticles, such that, preferably, the aspect ratio between the table faces and the end faces of the microparticles is 10 or higher. An aspect ratio of the flat-shaped microparticles 3 lower than 10 is undesirable, since in that case the shape of the microparticles is close to a needle-like or rod-like shape and a card-house aggregate structure is not formed readily, so that a coating film 5 with desired water repellency may not be obtained.

The average particle size of the primary particles of the flat-shaped microparticles 3 ranges preferably from 100 nm to 100 µm, more preferably from 100 nm to 10 µm, and most preferably from 200 nm to 3 µm. As used herein, the term particle size of the flat-shaped microparticles 3 denotes the length in the longitudinal direction of the particles. An average particle size of the primary particles of the flat-shaped microparticles 3 smaller than 100 nm is undesirable since the required uneven structure for enhancing water repellency may not be obtained in such cases. An average particle size of the primary particles of the flat-shaped microparticles 3 in excess of 100 µm becomes undesirable since in that case the spacing between flat-shaped microparticles 3 is excessively larger than droplets, and a coating film 5 with desired water repellency may not be obtained. In the present invention, the average particle size of primary particles of the flat-shaped microparticles 3 is a value measured in accordance with a dynamic light scattering method.

The average particle size of the flat-shaped microparticles 3 in an aggregated state ranges preferably from 125 nm to 200 µm, and more preferably from 10 µm to 100 µm. An average particle size of the flat-shaped microparticles 3 in an aggregated state smaller than 125 nm is undesirable since, in that case, the difference from the fine uneven structure formed by the hydrophobic microparticles 2 decreases, and, as a result, the enhancing effect on water repellency elicited by a combination of uneven structures may in some instances not be achieved. An average particle size of the flat-shaped microparticles 3 in an aggregated state in excess of 200 µm is undesirable since, in that case, the adhesiveness of the binder resin 4 decreases, the surface shape of the coating film 5 may change due to external stimuli, and water repellency may thus be impaired.

Examples of the flat-shaped microparticles 3 that form a card-house structure include, for instance, smectite, tobermorite, bentonite, kaolin, mica, boehmite, aluminum, alumina, silica, calcium silicate, calcium carbonate, silicate minerals, alumina, silica, calcium carbonate, boron nitride, graphene, titanium oxide, hydroxide compounds, carbonate compounds, phosphate compounds, silicate compounds, titanate compounds and the like.

The flat-shaped microparticles 3 can be commercially obtained, for instance under the product names "Tobermorite TJ" (by Japan Insulation Co. Ltd.), "Serashuru BMF" (by Kawai Lime Industry Co. Ltd.); "Serashuru BMM" (by Kawai Lime Industry Co. Ltd.); "Serashuru BMT" (by Kawai Lime Industry Co. Ltd.); "Serashuru BMN" (by Kawai Lime Industry Co. Ltd.); "Sunlovery" (by AGC SI-Tech Co. Ltd.), "Sunlovery" (by AGC SI-Tech Co. Ltd.), "TERRACESS" (by Otsuka Chemical Co. Ltd.), "Aluminum paste" (by Toyo Aluminum Co. Ltd.); "Serath" (by Kinsei Matec Co. Ltd.), "Silky flake" (by Nippon Sheet Glass Co. Ltd.), "Glass flake" (by Nippon Sheet Glass Co. Ltd.), "Micro mica" (by Co-op Chemical Co. Ltd.), "Somasif" (by Co-op Chemical Co. Ltd.), "Lucentite" (by Co-op Chemical Co. Ltd.), "SBN" (by Showa Denko Co. Ltd.), "Denka boron nitride" (by Denki Kagaku Kogyo Co. Ltd.), "PS35-A" (by New Lime Co. Ltd.), and "PS15-A" (by New Lime Co. Ltd.).

The binder resin 4 is not particularly limited, so long as it is a solvent-soluble binder, and known resins in this technical field can be used. Examples of the binder resin 4 preferably used in the present invention include, for instance, polyvinylidene fluoride (PVDF) and fluoroolefin copolymers. Examples of monomer components that yield fluoroolefin copolymers include, for instance, chlorotrifluoroethylene, tetrafluoroethylene, and vinyl esters having various substituents.

Both polar organic solvents and non-polar organic solvents can be used as the solvent that is used in the coating composition of the present invention. Examples of solvents preferably used in the present invention include, for instance, fluorine-based solvents, chlorine-based solvents, aromatic hydrocarbon solvents such as toluene and xylene, aliphatic hydrocarbon solvents, ester solvents such as ethyl acetate and butyl acetate, ketones such as methyl isobutyl ketone and acetone, as well as ether solvents.

Known additives such as dispersants, leveling agents, evaporation inhibitors, adhesion modifiers and the like may be added to the coating composition of the present invention in amounts such that the effect of the invention is not impaired.

The coating film 5 can be formed by applying the coating composition described above onto a base material 1, and drying it. The coating method of the coating composition is not particularly limited, and any known method in the technical field in question may be resorted to. Examples of coating methods include, for instance, spray coating, dip coating and the like. The drying conditions are not particularly limited, and may be adjusted, as appropriate, in accordance with, for instance, the composition of the coating composition.

The base material 1 on which the coating film 5 is formed is not particularly limited, and can be selected, as appropriate, in accordance with the type of article in which a water-repellent member is to be used. Examples of the base material 1 include, for instance, metal substrates such as aluminum substrates, stainless steel substrates and the like, as well as glass substrates and plastic substrates.

Figure 6:
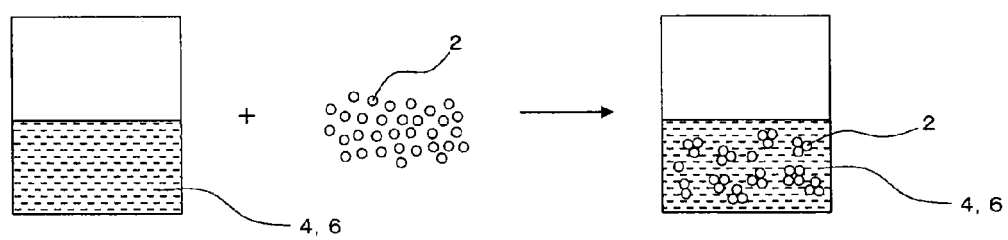
FIG. 6 is a schematic diagram for explaining a production process of the coating composition of the present invention.
Figure 7:
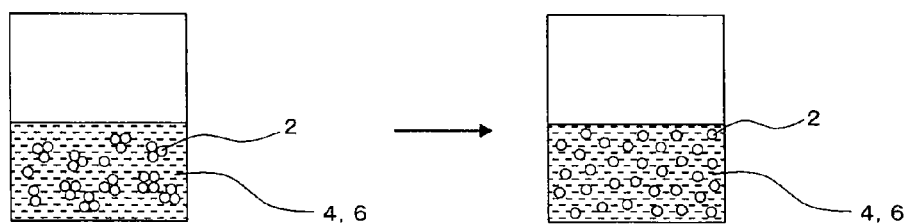
FIG. 7 is a schematic diagram for explaining a production process of the coating composition of the present invention.
Figure 8:
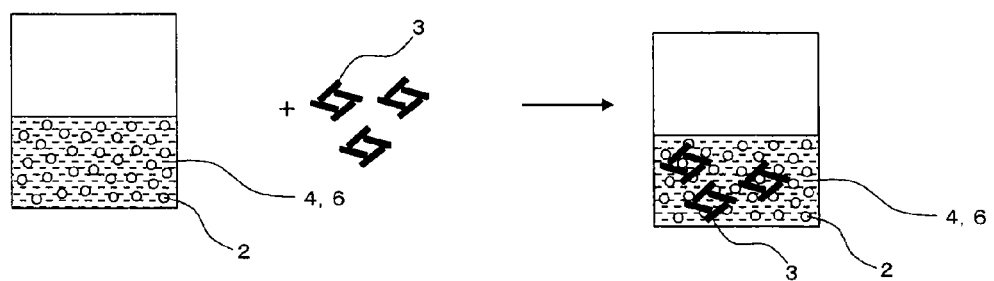
FIG. 8 is a schematic diagram for explaining a production process of the coating composition of the present invention.

Next, a method for producing the coating composition of the present invention will be explained with reference to FIG. 6 to FIG. 8. The coating composition of the present invention is obtained in accordance with a production method that involves mixing the solvent 6, the binder resin 4 and the hydrophobic microparticles 2, subjecting the resulting mixture to a dispersing treatment to yield a dispersion, and thereafter, adding the flat-shaped microparticles 3 that form a card-house aggregate structure, to the dispersion. FIG. 6 is a schematic diagram for explaining the state of the mixed solution obtained by mixing the binder resin 4, dissolved in the solvent 6, and the hydrophobic microparticles 2. In this mixed solution, most of the hydrophobic microparticles 2 are dispersed in the form of secondary particles. FIG. 7 is a schematic diagram for explaining the state of the dispersion that is obtained by subjecting the mixed solution illustrated in FIG. 6 to a dispersing treatment. In this dispersion, the hydrophobic microparticles 2 are homogeneously dispersed in the form of primary particles. FIG. 8 is a schematic diagram for explaining the state of a coating composition that is obtained by adding the flat-shaped microparticles 3 that form a card-house aggregate structure, to the dispersion illustrated in FIG. 7.

In the present invention, the hydrophobic microparticles 2 are preferably dispersed in an organic solvent, through the effect of cavitation, in order for the hydrophobic microparticles 2 to be dispersed homogeneously. The cavitation effect is herein a phenomenon whereby bubbles are generated, through vaporization of local low-pressure portions, in a liquid that is flowing at high speed. Cavitation can be achieved, for instance, by adding the hydrophobic microparticles 2 to an organic solvent, and then dispersing the hydrophobic microparticles 2 by applying a pressure of about 10 MPa to 400 MPa, using high a high-pressure wet atomization apparatus.

In the present invention, the flat-shaped microparticles 3 forming a card-house aggregate structure are preferably dispersed, in an organic solvent, in accordance with a method in which no strong shear forces are exerted. Such dispersion can be achieved, for instance, by adding the flat-shaped microparticles 3 that form a card-house aggregate structure, to an organic solvent, followed by dispersion using a shaker or the like. If strong shear forces are exerted, the card-house aggregate structure breaks down, which precludes obtaining the desired water repellency.

EXAMPLES

The present invention will be explained in detail below with reference to examples, but the present invention is not limited to these examples, and can accommodate various applications without departing from the technical scope of the invention. Measurements and evaluations in the examples and comparative examples were conducted in accordance with the methods described below.

<Evaluation of Superhydrophobicity>

The initial contact angle with a water droplet was measured, as described below, in order to evaluate superhydrophobicity. As used herein, the term "superhydrophobicity" denotes the property of exhibiting a contact angle with water of 150 degrees or more.

Specifically, a 2 µL water droplet in the atmosphere (about 25° C.) was dropped on the coating film, and the static contact angle with the water droplet was measured, using a contact angle meter model DM301, by Kyowa Interface Science Co., Ltd. Superhydrophobicity was evaluated on the basis of the evaluation criteria below.

◯: contact angle with water of 150 degrees or more, which is the criterion for superhydrophobicity X: contact angle with water smaller than 150 degrees, which is less than the criterion for superhydrophobicity <Evaluation of Superoleophobicity>

The initial contact angle of a water droplet was measured, as described below, in order to evaluate superoleophobicity. As used herein, the term "superoleophobicity" denotes herein the property of exhibiting a contact angle of 150 degrees or more with a droplet having a surface tension smaller than that of water.

Specifically, 2 µL of a wetting reagent in the atmosphere (about 25° C.) were dropped on the coating film, and the static contact angle with the water droplet was measured, using a contact angle meter model DM301, by Kyowa Interface Science Co., Ltd. Superoleophobicity was evaluated on the basis of the evaluation criteria below.

◯: contact angle of 150 degrees or more with a liquid having a surface tension of 48 mN/m or greater X: contact angle smaller than 150 degrees with a liquid having a surface tension of less than 48 mN/m Example 1

3.0 parts by mass of hydrophobic silica (product name "Aerosil RX200", by Nippon Aerosil Co. Ltd.) having a hydrophobic surface and an average primary particle size of about 12 nm, and 3.0 parts by mass of a binder resin (product name "Fluonate K-700", by Dainippon Ink Co., Ltd.), were added to 91.0 parts by mass of butyl acetate, and the whole was mixed and subjected to a dispersing treatment using a wet atomization apparatus. Thereafter, 3.0 parts by mass of flat-shaped microparticles (product name "Tobermorite TJ", by Japan Insulation Co. Ltd.) having an average primary particle size of 1 µm, and an average particle size of 17 µm in the aggregated state, were further added, with shaking and stirring, to yield a coating composition. The obtained coating composition was applied onto a glass plate and was dried, to produce a member for evaluation provided with a coating film.

Example 2

3.0 parts by mass of hydrophobic silica (product name "Aerosil RX200", by Nippon Aerosil Co. Ltd.), having a hydrophobic surface and an average primary particle size of about 12 nm, and 3.0 parts by mass of a binder resin (product name "SSG ME90L", by Nittobo Medical Co. Ltd.) were added to 91.0 parts by mass of butanol, and the whole was mixed and subjected to a dispersing treatment using a wet atomization apparatus. Thereafter, 3.0 parts by mass of flat-shaped microparticles (product name "Tobermorite TJ", by Japan Insulation Co. Ltd.) having an average primary particle size of 1 µm, and an average particle size of 17 µm in the aggregated state, were further added, with shaking and stirring, to yield a coating composition. A member for evaluation was produced in the same way as in Example 1, using the obtained coating composition.

Comparative Example 1

A coating composition was prepared in the same way as in Example 1, but herein the dispersing treatment was performed using a wet atomization apparatus, instead of by shaking and stirring. The card-house aggregate structure of the flat-shaped microparticles in the coating composition broke down due to the dispersing treatment. A member for evaluation was produced in the same way as in Example 1, using the obtained coating composition.

Comparative Example 2

A coating composition was prepared in the same way as in Example 2, but herein the dispersing treatment was performed using a wet atomization apparatus, instead of by shaking and stirring. The card-house aggregate structure of the flat-shaped microparticles in the coating composition broke down due to the dispersing treatment. A member for evaluation was produced in the same way as in Example 1, using the obtained coating composition.

Comparative Example 3

3.0 parts by mass of hydrophobic silica (product name "Aerosil RX200", by Nippon Aerosil Co. Ltd.) having a hydrophobic surface and an average primary particle size of about 12 nm, and 3.0 parts by mass of a binder resin (product name "Fluonate K-700", by Dainippon Ink Co., Ltd.), were added to 94.0 parts by mass of butyl acetate, and the whole was mixed and subjected to a dispersing treatment using a wet atomization apparatus, to yield a coating composition. A member for evaluation was produced in the same way as in Example 1, using the obtained coating composition.

Comparative Example 4

3.0 parts by mass of hydrophobic silica (product name "Aerosil RX200", by Nippon Aerosil Co. Ltd.) having a hydrophobic surface and an average primary particle size of about 12 nm, and 3.0 parts by mass of a binder resin (product name "Fluonate K-700", by Dainippon Ink Co., Ltd.), were added to 91.0 parts by mass of butyl acetate, and the whole was mixed and subjected to a dispersing treatment using a wet atomization apparatus. Thereafter, 3.0 parts by mass of rod-like microparticles (product name "Wollastonite", by Harada Corporation) were further added, with shaking and stirring, to yield a coating composition. A member for evaluation was produced in the same way as in Example 1, using the obtained coating composition.

Comparative Example 5

A coating composition was produced, and a member for evaluation produced, in the same way as in Comparative example 4, but herein the dispersing treatment was performed using a wet atomization apparatus, instead of by shaking and stirring.

Comparative Example 6

3.0 parts by mass of flat-shaped microparticles (product name "Tobermorite TJ", by Japan Insulation Co. Ltd.) having an average primary particle size of 1 μm, and an average particle size of 17 μm in the aggregated state, and 3.0 parts by mass of a binder resin (product name "Fluonate K-700", by Dainippon Ink Co., Ltd.) were added to 94.0 parts by mass of butyl acetate, with shaking and stirring to yield a coating composition. A member for evaluation was produced in the same way as in Example 1, using the obtained coating composition.

Comparative Example 7

A coating composition was produced in the same way as in Comparative example 6, but herein the dispersing treatment was performed using a wet atomization apparatus, instead of by shaking and stirring. The card-house aggregate structure of the flat-shaped microparticles in the coating composition broke down due to the dispersing treatment. A member for evaluation was produced in the same way as in Example 1, using the obtained coating composition.

Table 1 sets out the evaluation results for Examples 1 and 2 and Comparative examples 1 to 7.

TABLE 1

|  |  | Example 1 | Example 2 | Comparative example 1 | Comparative example 2 | Comparative example 3 | Comparative example 4 | Comparative example 5 | Comparative example 6 | Comparative example 7 |
|---|---|---|---|---|---|---|---|---|---|---|
| Hydrophobic microparticles | Aerosil RX200 | 3 | 3 | 3 | 3 | 3 | 3 | 3 | 0 | 0 |
| Binder resin | Fluonate K-700 | 3 | 0 | 3 | 0 | 3 | 3 | 3 | 3 | 3 |
|  | SSG ME90L | 0 | 3 | 0 | 3 | 0 | 0 | 0 | 0 | 0 |
| Solvent | Butyl acetate | 91 | 0 | 91 | 0 | 94 | 91 | 91 | 94 | 94 |
|  | n-butanol | 0 | 91 | 0 | 91 | 0 | 0 | 0 | 0 | 0 |
| Flat-shaped microparticles | Tobermorite TJ | 3 | 3 | 3 | 3 | 0 | 0 | 0 | 3 | 3 |
| Rod-like microparticles | Wollastonite | 0 | 0 | 0 | 0 | 0 | 3 | 3 | 0 | 0 |
| Card-house aggregate structure |  | Yes | Yes | No | No | No | No | No | Yes | No |
| Superhydrophobicity |  | ○ | ○ | ○ | ○ | ○ | ○ | ○ | × | × |
| Superoleophobicity |  | ○ | ○ | × | × | × | × | × | × | × |

The results in Table 1 revealed that superhydrophobicity and superoleophobicity can be imparted only in cases of combinations of hydrophobic microparticles and flat-shaped microparticles forming a card-house aggregate structure.

Examples 3 to 5

Coating compositions were prepared, and members for evaluation produced, in the same way as in Example 1, but herein the formulation amount of the flat-shaped microparticles (product name "Tobermorite TJ", by Japan Insulation Co. Ltd.) having an average primary particle size of 1 μm, and an average particle size of 17 μm in the aggregated state, were modified as set out in Table 2. The evaluation results are given in Table 2.

TABLE 2

|  |  | Example 3 | Example 4 | Example 5 |
|---|---|---|---|---|
| Hydrophobic microparticles | Aerosil RX200 | 3 | 3 | 3 |
| Binder resin | Fluonate K-700 | 3 | 3 | 3 |
|  | SSG ME90L | 0 | 0 | 0 |
| Solvent | Butyl acetate | 93 | 92 | 90 |
|  | n-butanol | 0 | 0 | 0 |

TABLE 2-continued

|  |  | Example 3 | Example 4 | Example 5 |
|---|---|---|---|---|
| Flat-shaped microparticles | Tobermorite TJ | 1 | 2 | 4 |
| Rod-like microparticles | Wollastonite | 0 | 0 | 0 |
| Card-house aggregate structure | | Yes | Yes | Yes |
| Superhydrophobicity | | ○ | ○ | ○ |
| Superoleophobicity | | ○ | ○ | ○ |

The results in Table 2 revealed that superhydrophobicity and superoleophobicity can be imparted even when the addition amount of flat-shaped microparticles is modified.

The number of cracks that occurred per square centimeter, observable on the basis of optical micrographs, was evaluated for the surface of the members for evaluation obtained in Examples 1 and 6 and Comparative examples 3 and 4. The results are given in Table 3. The number of cracks refers herein to the total number of crack branches.

TABLE 3

|  | Number of cracks per cm² | Card-house aggregate structure |
|---|---|---|
| Example 1 | 1 | Yes |
| Example 6 | 2 | Yes |
| Comparative example 3 | 15 | No |
| Comparative example 4 | 13 | No |

The results in Table 3 revealed that that the number of cracks can be reduced by adding the flat-shaped microparticles that form a card-house aggregate structure.

As the above results indicate, the present invention succeeds in providing a coating composition that allows forming a coating film in which uneven structures are compounded, and that exhibits simultaneously superhydrophobicity and superoleophobicity, through addition of the flat-shaped microparticle that form a card-house aggregate structure.

The present international application claims priority based on Japanese Patent Application No. 2013-000654, filed with the JPO on Jan. 7, 2013, the entire contents whereof are incorporated herein by reference.

REFERENCE SIGNS LIST 1 base material
2 hydrophobic microparticles
3 flat-shaped microparticles
4 binder resin
5 coating film
6 solvent

The invention claimed is:

1. A coating composition, wherein hydrophobic microparticles, and flat-shaped microparticles forming a card-house aggregate structure, are dispersed in a binder resin dissolved in a solvent.

2. The coating composition according to claim 1, wherein an aspect ratio of table faces and end faces of the flat-shaped microparticles is 10 or higher.

3. The coating composition according to claim 1, wherein the average primary particle size of the flat-shaped microparticles ranges from 100 nm to 100 μm.

4. The coating composition according to claim 1, wherein the hydrophobic microparticles are hydrophobic silica having an average primary particle size of 100 nm or smaller.

5. The coating composition according to claim 1, wherein the average particle size of the flat-shaped microparticles in an aggregated state ranges from 125 nm to 200 μm.

6. The coating composition according to claim 1, wherein a mass ratio of the hydrophobic microparticles to the binder resin ranges from 0.5 to 12.

7. The coating composition according to claim 1, wherein a mass ratio of the hydrophobic microparticles to the flat-shaped microparticles ranges from 0.5 to 5.

8. The coating composition according to claim 1, wherein a mass ratio of the flat-shaped microparticles to the binder resin ranges from 0.25 to 12.

9. A method for producing a coating composition, comprising the steps of:
   mixing a solvent, a binder resin and hydrophobic microparticles, and subjecting the mixture to a dispersion treatment to yield a dispersion; and
   adding, to the dispersion, flat-shaped microparticles forming a card-house aggregate structure.

10. A coated article, comprising a coating film obtained through application and drying of the coating composition according to claim 1.

* * * * *